2,899,564

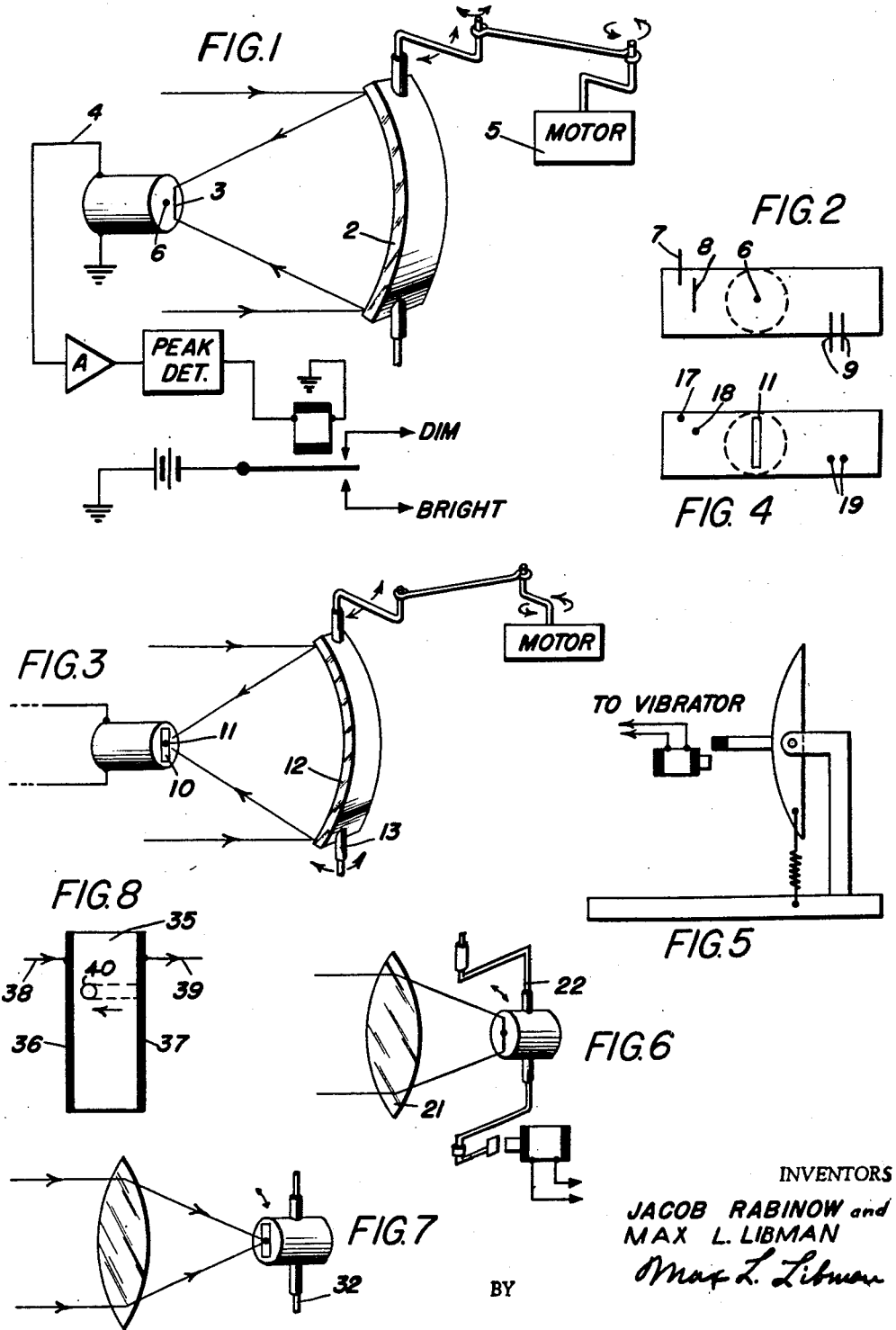

SINGLE-TRACK SCANNING TYPE DIMMER

Jacob Rabinow, Takoma Park, Md., and
Max L. Libman, Vienna, Va.

Application April 26, 1957, Serial No. 655,265

9 Claims. (Cl. 250—235)

This invention relates to automatic headlight dimmers and more particularly to an improvement over the type of dimmer shown in the copending application, Serial No. 388,801, for Scanning Type Headlight Dimmer, filed October 28, 1953, by Jacob Rabinow now Patent No. 2,863,064, issued December 2, 1958.

The dimmer shown in the above application uses a mirror mechanically oscillated in two different planes at right angles to each other to produce relative scanning between a photocell having substantially a single point sensitive area and the image of a field of view ahead of a vehicle. The scanning is produced along a number of substantially parallel tracks entirely covering the field to be scanned. By oscillating the mirror rapidly in one direction and relatively slowly in the other, all points in the image are made to pass over the small sensitive area, so that the presence of a bright spot in the field of view will cause a response in the photocell circuit, which response is utilized to control automatic operation of the dimming of the vehicle headlights.

The present invention relates to an improvement in the above described system whereby it is necessary only to oscillate the mirror in a single plane, thereby eliminating the mechanical complexity of means for producing oscillation at two different speeds in two different planes, and also insuring a response on each sweep. According to the present invention, the entire scanning is accomplished by relative motion of the image and the sensitive element along a single linear track.

According to one form of the invention the image is brought, not to a point focus as in my prior application, but to a line focus which is then swept across the small sensitive point of a photocell, whereby a single sweep can cause detection of any bright spot in the field of view. In practice, repetition of the sweep provides a periodic pulse signal while the bright spot or spots remain in the field, and this periodic signal is used to actuate the dimmer. Conversely, the sensitive element may extend linearly transversely to the direction of sweep, and the image be brought to an ordinary focus as in my prior application. In this case, a bright spot in any position in the field should sweep across some portion of the linearly extended sensitive element during each single scan of the field.

It is accordingly a major object of the invention to provide a scanning dimmer in which a single-track scan will provide information concerning the presence or absence of a bright spot or spots in the field of view.

The specific nature of the invention as well as other objects and advantages thereof will clearly appear from a description of a preferred embodiment as shown in the accompanying drawing, in which:

Fig. 1 is a schematic diagram illustrating one form of the invention using a point sensitive photoelectric cell;

Fig. 2 is a diagram showing the relation of the image of the field of view and of bright spots therein to the sensitive area of the photocell of Fig. 1;

Fig. 3 is a schematic diagram illustrating a form of the invention which uses a line-sensitive photocell;

Fig. 4 is a diagram showing the relation of the image of the field of view to the sensitive area of the photocell arrangement of Fig. 3;

Fig. 5 is a schematic diagram of a modification of the invention using a magnetic vibrator to oscillate the mirror;

Fig. 6 is a schematic diagram of a modification using a refracting lens wherein a point sensitive photosensitive element is vibrated by an electromagnet;

Fig. 7 shows a modification using a refracting lens and a line sensitive photocell; and Fig. 8 is an exaggerated view of the surface of a linearly extending cell similar to that shown in Fig. 3, illustrating a light-retentive effect which improves the operation.

Experience has shown that while it is theoretically desirable to oscillate the mirror so as to scan the field of view in a zigzag fashion, this requires a rather complicated mirror mounting and that a simplified scan can be used instead. Referring to Fig. 1, the mirror 2 is made slightly non-spherical, so that instead of focusing rays of light coming from a distance into a single point, it can be made to produce a short thin vertical line 3 at its focus, and this line is designed to be equal to the height of the image of the field of view. The mirror is oscillated from side to side only by any suitable means as shown as a crank arm and motor 5, so that this vertical line sweeps across sensitive point 6 of the cell 4. Another way to state this is that the cell sweeps laterally with respect to the image containing a set of vertical line images of points of light in the desired field of view. In this way, while not all of the desired light hits the photocell, which is in this embodiment a small area 3, this version of the invention does, nevertheless, eliminate the vertical scanning at some sacrifice in efficiency. If the system has enough over-all gain, this sacrifice in efficiency can be tolerated. The relation between the light in the field of view and the photocell spot can be seen in Fig. 2. The vertical lines 7, 8 represent the images of points of light. The actual position of each point in the field is at the center of its respective line. If there are two headlights, there will be only two such vertical lines, for example, as shown at 9; if there are more light sources in the field, there will be more lines of light in the distorted image produced by the lens 2.

Another method of accomplishing this type of simplified scanning, which has some advantage, is to use a photocell which is made into the form of a thin vertical line, together with a spherical or a parabolic mirror. It should be recognized, of course, that for small curvatures, a spherical mirror approximates the parabolic mirror well enough for our purpose; both give essentially a small area of light in the image when light from a distant headlight impinges upon the mirror. In this embodiment of the invention, shown in Fig. 3, the light is focused as it was in my earlier-filed application above referred to into a point in the image of a field of view which can be seen at 11 in Fig. 3. The photocell, however, has a vertically disposed sensitive area 10 of sufficient vertical extent to span the height of the image of the field of view. As the mirror 12 oscillates about axis 13, this field of view moves back and forth across the cell 10 so that the photocell scans all of the light spots 11 anywhere in the field of view, and if the photocell can respond to a small spot of light crossing it anywhere on its face, the correct output will be obtained. Such photo cells are now manufactured in quantity, for instance, having cadmium selenide as the sensitive material. Cadmium selenide is preferred at the present writing because of its high sensitivity. Such cells are manufactured by the Clairex Mfg. Co., of New York City, and others.

As stated above, the advantages of using either an elongated cell or a system to produce an elongated spot of light are that the two axis motion of the mirror is eliminated, and a very simple oscillating action is required. To accomplish this, a simple drive using a motor driven eccentric crank as shown in Figs. 1 and 3 can be used. Or, still differently, the mirror can be driven from side to side by an electromagnetic solenoid. The magnet may be energized from the vibrator of the power supply, where vacuum tube components are used in the dimmer, or may be self-energized from the battery by any conventional buzzer circuit arrangement. The speed of scan is not critical except that it must be high enough so that the output relay does not chatter.

Fig. 4 shows schematically the relationship of the images of light sources in the field of view to the configuration of the cell area 11. The points 17, 18 and 19 show the images of light sources corresponding to images 7, 8 and 9 respectively in Fig. 2. It will be understood that as the mirror is oscillated the line images in Fig. 2 sweep across the point cell 6 and the point sources in Fig. 6 sweep across the line cell 11 to produce output pulse signals in each case.

Instead of a mirror to focus the light onto the photocell, a lens 21 can be used as shown in Fig. 6, and here the image again can be so distorted as to produce vertical lines instead of points by using a cylindrical element "correction back" ground into the lens. Scanning can be accomplished by moving the cell from side to side about axis 22 as shown in Fig. 6, or the lens system can be normal without any cylindrical elements but the photocell can be again built into a shape of a thin, vertical area whose length is equal to the height of the image, as in Fig. 7.

It should be understood by those versed in the optical art that moving the lens from side to side is equivalent to moving the cell, and it is immaterial whether either motion or both are used together in any of these systems. The thing that is important is that the image and the photocell are moved relatively to each other from side to side and that the image is so distorted or the cell is so shaped that any light from the desired field of view impinges upon the cell on each of its motions across the field.

The optical efficiency of this system, like that of the systems shown in Figs. 1 and 3, is lower than that of the zigzag scan of my earlier application, but the simplicity of moving an object in a single plane is justified if cells of sufficient sensitivity are available, which is the case at present. The suppression of background illumination is not as great, for the same reason, because a vertical line scan obviously picks up more of the background than the point scan, but if the line is sufficiently thin, the background is suppressed by a very large amount and a satisfactory dimmer can be achieved.

Because some photosensitive cells, such as cadmium selenide cells, have a long decay time, the path covered by the light spot as it traverses the surface of the cell will remain conductive longer than it takes the spot to traverse the cell. This means that current flows through this path and the effect of the light is multiplied by this "memory." If the cell had no memory, the effect of light would be to reduce the resistance at one spot only, with the rest of the path having high resistance. While this would provide an electrical effect, this effect would be smaller than would be obtained with the slow-decay elements above described. When two lights, such as two headlights at the same distance above ground, traverse the same strip of the cell, the effect is accumulative, and a correspondingly still greater output is obtained. This is illustrated in Fig. 8, where the cell 35 has an appreciable surface area extending between the electrodes 36 and 37, which are of sufficient longitudinal extent to entirely cover the field of view as indicated in Figs. 3 and 4. The spot 40 in traversing the surface of the cell leaves behind it a low-resistance track for appreciable length of time, which still further decreases the resistance between electrodes 38 and 39, and thus enhances the sensitivity as above described. The dimensions of a typical cell useful for the above purpose are about one-sixteenth by three-sixteenth inches. The size of the image 40, is only a few thousandths of an inch in diameter.

It will be apparent that the embodiments shown are only exemplary and that various modifications can be made in construction and arrangement within the scope of our invention as defined in the appended claims.

We claim:

1. In a headlight dimmer, optical focusing means to produce an image of a desired field of view ahead of a vehicle, photoelectric means having a photosensitive surface substantially smaller than the area of said image, means to produce relative oscillation of said image and said photosensitive surface back and forth along a single line only, for a distance sufficient to sweep the entire width of the image of the field of view, said optical means and said photoelectric device being arranged to produce an output signal in response to the light output of small elongated areas of the field of view transverse to the direction of said oscillation, and means operable by the output of said photoelectric means to dim the headlights of a vehicle in response to the said output.

2. The invention according to claim 1, said photosensitive surface being relatively long and narrow with its narrow dimension in the direction of said line and its long dimension extending entirely across said field of view in a direction substantially perpendicular to said line.

3. The invention according to claim 2, said photosensitive surface having a slow decay characteristic, whereby the effect of a light spot traversing its area is intensified.

4. The invention according to claim 2, said means for oscillating comprising means for oscillating said photosensitive element.

5. The invention according to claim 2, said means for oscillating comprising means for oscillating said optical system.

6. The invention according to claim 1, said photosensitive surface having substantially a point area as compared with the area of said image, said optical means comprising means to spread the light received from any point in the field of view in a line transverse to the direction of said oscillation while bringing it into a focus in the direction of said oscillation so that any point source of light in said field is spread into a narrow line in the focal plane of said optical means, said narrow line being transverse to said direction of oscillation, and of sufficient length so that at least a portion thereof traverses said photosensitive surface during said oscillation, and means operable by the output of said photoelectric means to dim the headlights of a vehicle in response to a given minimum of light intensity at a spot of light in said small area.

7. The invention according to claim 6, said means for oscillating comprising means for oscillating said photosensitive element.

8. The invention according to claim 6, said means for oscillating comprising means for oscillating said optical system.

9. In a headlight dimmer, optical focusing means to produce an image of a desired field of view ahead of a vehicle, photoelectric means having an effective photosensitive surface substantially smaller in area than the area of said image, means to oscillate said image relative to said photosensitive surface in a line passing across said surface, said optical means comprising means to spread the light received from any point in the field of view in a line transverse to the direction of said line while bringing it to a focus in said direction so that any point source of light in said field is spread into a narrow line in the focal plane of said optical means, said narrow line being transverse to said line, and of sufficient length so that at least a portion thereof lies on said surface during said oscillation and means operable by the output of said photosensitive means to dim the headlights of a vehicle in response to a given variation of light intensity in said image.

References Cited in the file of this patent

UNITED STATES PATENTS

| | | |
|---|---|---|
| 1,648,058 | Parker | Nov. 8, 1927 |
| 2,486,334 | Slamar | Oct. 25, 1949 |
| 2,489,305 | McLennan | Nov. 29, 1949 |
| 2,624,848 | Hancock et al. | Jan. 6, 1953 |
| 2,632,040 | Rabinow | Mar. 17, 1953 |
| 2,753,487 | Bone | July 3, 1956 |
| 2,795,736 | Dilks | June 11, 1957 |
| 2,863,064 | Rabinow | Dec. 2, 1958 |